United States Patent [19]

Yamazaki

[11] Patent Number: 5,346,416

[45] Date of Patent: * Sep. 13, 1994

[54] EXHAUST SYSTEM FOR OUTBOARD MOTOR

[75] Inventor: Susumu Yamazaki, Hamamatsu, Japan

[73] Assignee: Sanshin Kogyo Kabushuki Kaisha, Hamamatsu, Japan

[*] Notice: The portion of the term of this patent subsequent to Feb. 18, 2009 has been disclaimed.

[21] Appl. No.: 105,475

[22] Filed: Aug. 12, 1993

Related U.S. Application Data

[63] Continuation of Ser. No. 661,431, Feb. 25, 1991, abandoned.

[30] Foreign Application Priority Data

Feb. 25, 1990 [JP] Japan .................................. 2-42654

[51] Int. Cl.$^5$ ............................................. B63H 21/28
[52] U.S. Cl. ........................................ 440/89; 440/53; 440/61; 440/77; 440/900
[58] Field of Search ..................... 440/53, 57, 58, 59, 440/61, 75, 76, 77, 89, 111, 112, 900

[56] References Cited

U.S. PATENT DOCUMENTS

| | | | |
|---|---|---|---|
| 1,034,987 | 8/1912 | Dacassou | 440/53 |
| 1,785,089 | 12/1930 | Irgens | 440/89 |
| 2,460,419 | 2/1949 | Kincannon | 440/89 |
| 2,579,221 | 12/1951 | Wanzer | 440/59 |
| 2,781,748 | 2/1957 | Stucke | 440/89 |
| 3,198,162 | 8/1965 | Larsen | 440/89 |
| 3,577,952 | 5/1971 | Tado | 440/89 |
| 4,600,395 | 7/1986 | Pichl | 440/89 |
| 4,687,450 | 8/1987 | Bland et al. | 440/89 |
| 4,795,383 | 1/1989 | Binversie et al. | 440/89 |
| 4,940,434 | 7/1990 | Kiesling | 440/89 |
| 5,088,946 | 2/1992 | Nakayama | 440/900 |

FOREIGN PATENT DOCUMENTS 118020 5/1987 Japan .................................. 440/89

Primary Examiner—Michael S. Huppert
Assistant Examiner—Thomas J. Brahan
Attorney, Agent, or Firm—Knobbe, Martens, Olson & Bear

[57] ABSTRACT

An outboard motor for mounting on the transom of a boat, has a horizontal engine and output shaft, an exhaust system having a high speed exhaust discharge includes a horizontal portion and a vertical portion having an enlarged cross sectional water jacketed muffler within a water chamber having a retaining wall defining the water level, and a low speed exhaust discharge extending from the muffler into a conduit having an end disposed below the water level of said water chamber, a low speed exhaust gas expansion chamber receiving exhaust gas and expelling same to the atmosphere. The outboard motor is tiltable and provides an enclosure for the engine area including a cowling, hood, and moveable hood section and a sleeve between the moveable hood and engine to perfect enclosure during tilting.

8 Claims, 4 Drawing Sheets

EXHAUST SYSTEM FOR OUTBOARD MOTOR

This is a continuation of U.S. patent application Ser. No. 661,431, filed Feb. 25, 1991 now abandoned.

BACKGROUND OF THE INVENTION

This invention relates to an outboard motor, and more particularly, to an improved outboard motor having a compact configuration with an improved exhaust system having both a main high speed underwater discharge and a low speed exhaust gas discharge opening to the atmosphere.

It is well known in marine engines to silence the exhaust gases emanating from the engine, be it either an inboard or an outboard mounted engine, by passing them through the body of water in which the watercraft is operated. This is normally accomplished by a form of underwater exhaust gas discharge, such as those that discharge the exhaust gases through the hub of the propeller.

At high speed, the boat is typically raised upwardly causing a shallow immersion for the hub of the propeller and which, combination with the rearward motion of the water, facilitates the flow of exhaust gases through the hub of the propeller. However, when the watercraft is operating at low speed, the underwater exhaust gas discharge will become relatively deeply submerged, and this submergence coupled with the relatively low exhaust gas pressure in the exhaust path during low speed operation can give rise to high back pressure in the exhaust system.

High back pressure in the exhaust gas system impedes engine operation at low speeds. For that reason, it is the normal practice to employ a further, low speed, above the water discharge for discharging the exhaust gases directly to the atmosphere without flowing through the body of water in which the watercraft is operating under this low speed running condition.

Normally, the above water exhaust gas discharge is generally open under all conditions, and the flow path to it is provided with restrictions so as to ensure against excess noise when operating under high speed conditions. However, the above water exhaust gas discharge is typically just large enough to handle idling speed exhaust gases yet small enough to cause the bulk of the exhaust gases to become routed to the underwater exhaust at high engine speeds.

Insofar as other aspects of outboard motor design are concerned, conventional outboard motors generally are affixed so that they extend just rearwardly of the transom of a watercraft and include a driveshaft housing in which a vertically positioned driveshaft is journaled for driving a propulsion unit in the lower unit to propel the watercraft. An internal combustion engine is normally mounted in a power head above the driveshaft housing and has its output shaft directly coupled to the driveshaft for driving the propulsion unit.

Although this type of construction may have some advantages, it naturally lends itself to a limited length exhaust scheme, and little space for other features.

In addition to the aforenoted defects of the conventional type outboard motors, there are certain other defects which have been overcome by outboard motors having a construction of the type shown in co-pending U.S. patent application Ser. No. 661,430, filed Feb. 25, 1991, entitled "Exhaust System for Outboard Motor" filed in the name of Susumu Yamazaki, which application is assigned to the assignee hereof now U.S. Pat. No. 5,154,654. That outboard motor obviates the deficiencies of conventional outboard motors by placing the powering engine substantially forwardly of the transom of the watercraft and extending in a horizontally disposed position so that the engine output shaft rotates about a horizontally disposed axis. This configuration provides for an elongate, tuned, water jacketed exhaust system. This advantageous exhaust system pivots about the generally vertically extending steering axis and tilts about the generally horizontally extending pivot axis. The exhaust of the above-mentioned co-pending application is sufficiently silenced and cooled before being expelled in a high speed underwater discharge. Although such an arrangement has excellent advantages, there is some additional advantage to insuring that the exhaust gases produced during idle or at trolling speed are also sufficiently silenced and cooled before being expelled, and that a system for doing so is not accomplished against the significant back pressure inherent in the main exhaust route during idling or at trolling speed.

SUMMARY OF THE INVENTION

This invention is adapted to be embodied in an outboard motor for attachment as a unit to the transom of a watercraft and comprises means for affixing the outboard motor to the transom. An internal combustion engine has a horizontally disposed engine output shaft. A driveshaft housing journals a driveshaft for rotation about a generally vertically extending axis and drives propulsion means at the lower end of the driveshaft housing for propelling a watercraft. An extended, water jacketed, main, high speed exhaust system extends from the exhaust ports along the upper side of the engine to the drive unit, and includes a water jacketed muffler having an expanding cone at its entrance and a shrinking cone nearer its exit. An expansion chamber receives the cooled silenced exhaust gases from the muffler exit before the exhaust gases are expelled in the below water level propeller hub. The low speed exhaust system begins at the high speed exhaust system and includes cooling within the existing cooling water system, collection of the low speed exhaust gases over the cooling water system, a separate low speed expansion chamber and a separate low speed exhaust exit to the atmosphere.

DETAILED DESCRIPTION OF THE PREFERRED EMBODIMENT

Figure 1:
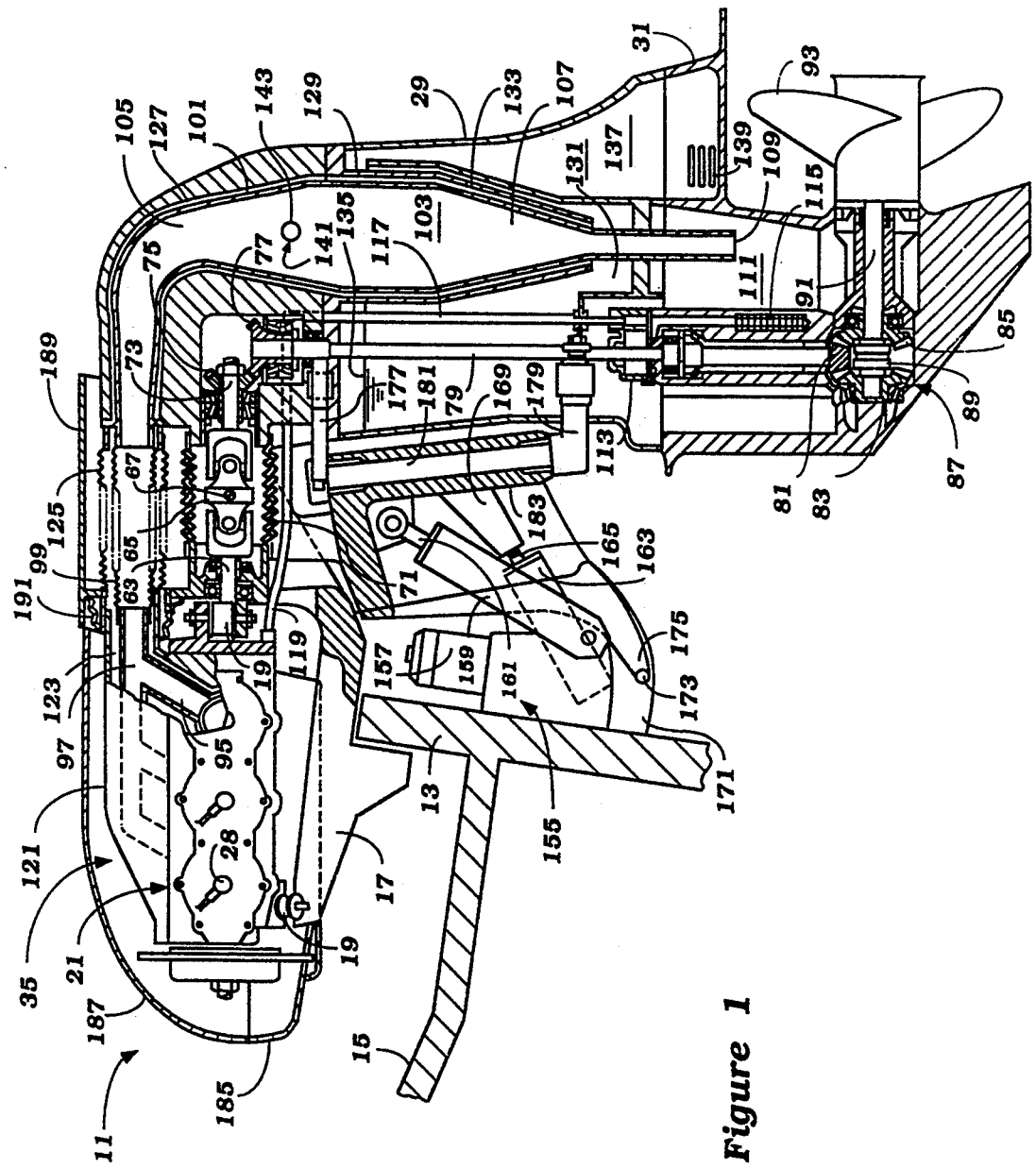
FIG. 1 is a side cross sectional view of the outboard motor of the present invention in its normal running position.
Figure 2:
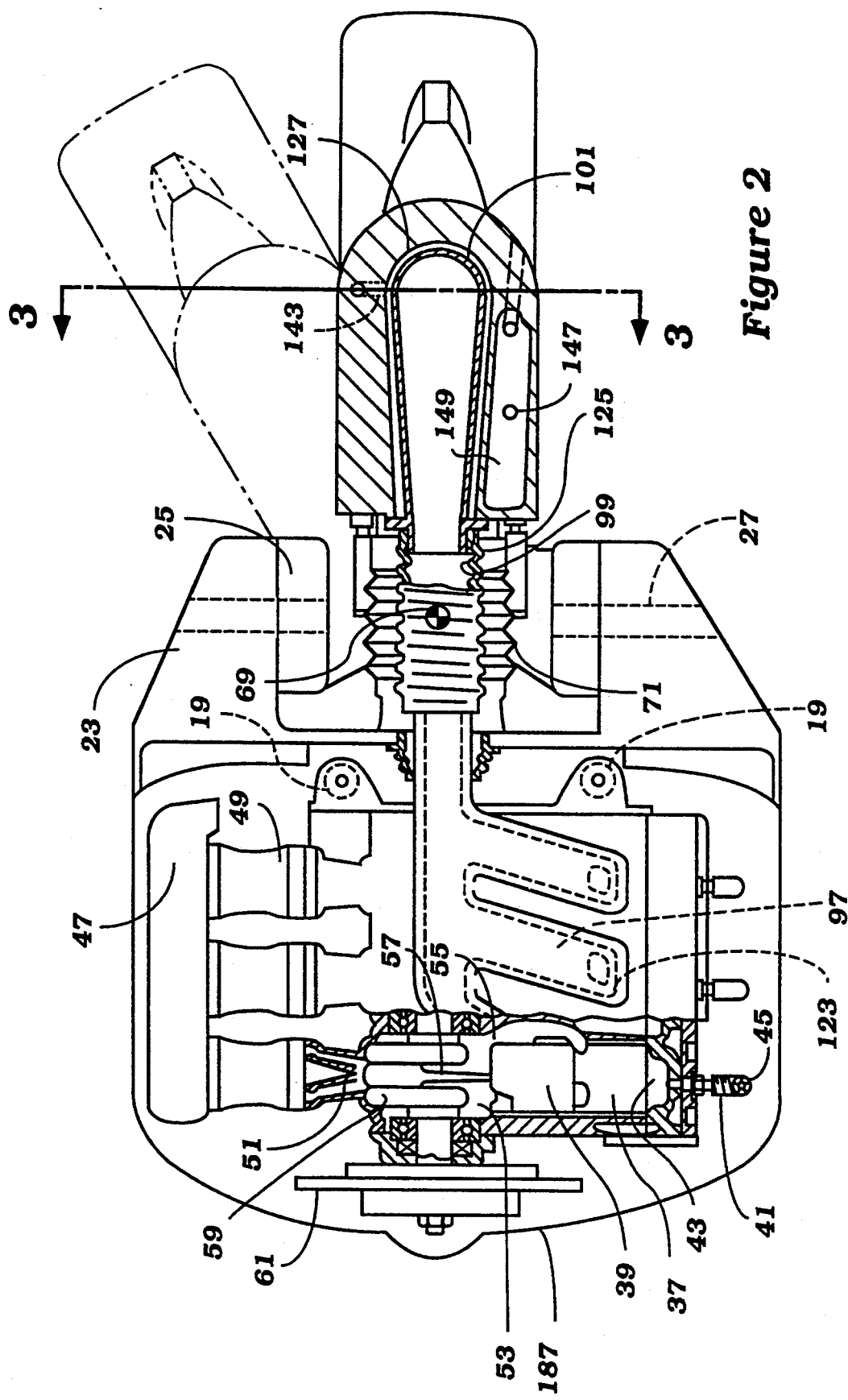
FIG. 2 is a top sectional view of the outboard motor illustrated in FIG. 1, emphasizing the exhaust transmission system.

Referring to FIGS. 1–5, the internal details and configuration of an outboard motor 11 of the present invention will be explained in great detail. The systems of outboard motor 11 cooperate in a synergistic manner to produce an outboard engine having a low profile, low center of gravity, an aftwardly oriented center of gravity, an extended exhaust system having increased efficiency and silencing, and a reduced space requirement. In FIGS. 1 and 2, the outboard motor 11 of the present invention is illustrated in operating position, attached to the transom 13 of a boat. Adjacent transom 13 is a motor well 15. The transom 11 and motor well 15 generally define the space available in a typical boat to accommodate a typical outboard motor.

The systems of outboard motor 11 of the present invention which cooperate to provide a superior outboard motor include the structural support and steering system, the mechanical power transmission system, the cooling system, the exhaust system, and the tilt system. Each of these systems will be explored in order to familiarize the reader with the manner in which they are cooperatively engaged by the outboard motor 11 of the present invention.

With regard to structural support, outboard motor 11 is adapted to be attached to transom 13 of a boat (not shown). The transom 13 and the motor well 15 not only provide the space within which the outboard motor of the present invention must limit its movement, but must provide support to outboard motor 11. Motor well 15 usually includes side boundaries, as are well known, but they are not illustrated in the figures.

Transom 13 supports a clamp bracket 17. Clamp bracket supports engine mounts 19, both of which provide cushioned support to a horizontally oriented engine 21. Referring to FIG. 2, clamp bracket 17 also supports an outer tilt bracket 23. An inner tilt bracket 25 is attached to outer tilt bracket 23 by means of a pair of pivot pins 27. Inner tilt bracket 25 angularly moves with respect to outer tilt bracket 23 about the pivot pins 27. The inner tilt bracket 25 is further connected to a driveshaft housing 29, and is in turn connected to a lower unit 31, as is shown in FIG. 1.

In the power transmission system, the engine 21 occupies a space generally referred to as the power head, which is generally indicated by the numeral 35. Referring to FIG. 2, the engine 21 contains a number of cylinders 37, each one of which occupied by a piston 39. Pistons 39 each oppose a spark plug 41 located in a combustion area 43. Spark plug 41 is electrically connected to a spark plug wire 45. A silencer 47 feeds air into a series of carburetors 49, which are in communication, through their respective intake manifolds 51, with crankcase 53. Scavenge ports 55 provide the fuel and air mixture to the cylinders 37, and combustion occurs in a well-known manner. Piston 39 is connected to a piston rod 57, which is in turn connected to a crank shaft 59. External with respect to engine 21, the crank shaft 59 engages a flywheel 61. At the aft end of engine 21, crank shaft 59 is connected to a drive shaft shown in FIG. 1.

Driveshaft 63 is connected to a universal joint 65. FIG. 1, center of universal joint 65 is marked showing the circular tilt axis 67. In FIG. 2, the circular swivel axis marker 69 is shown. In each case, the markers 67 and 69 each represent an axis about which tilting and swivelling, respectively, may occur. The universal joint 65 is surrounded by a transmission bellows 71 to protect and isolate the universal joint 65.

Universal joint 65 is in turn connected to a power transmission shaft 73. At the end of power transmission shaft 73 is a bevel gear 75. Bevel gear 75, which turns in the horizontal axis, makes beveled contact with a bevel gear which turns in the vertical axis. Bevel gear 77 is connected one end of driveshaft 79 which extends through and is suitably journaled in driveshaft housing 29. Driveshaft 79 extends into the lower unit 31 where it is connected to a gear 81. Gear 81 engages counter-rotating gears 83 and 85 within a gear box A clutch 89 is splined to a propeller shaft 91 and couples that shaft to either the gear 83 or 85 for selected forward or reverse drive. A propeller 93 is suitably fixed to propeller shaft 91 and is of a suitable type to make driving engagement with the water, such type dependent upon the load and running conditions of a boat.

Propeller 93 is typically of the type permitting discharge of exhaust gases through its hub, also known as a high speed gas discharge. This gas discharge is normally disposed below the surface of the water, as is propeller 93. Note also the relative aft displacement of the driveshaft 79 and the driveshaft housing 29, which causes a more aftwardly located center of gravity.

The exhaust system is best illustrated with reference to FIG. 1. First the main, high speed exhaust system will be explained in detail, followed by a detailed explanation of the low speed exhaust system. An exhaust port 95 is shown extending upwardly and aftwardly of engine 21 joining into an exhaust passage 97. As is shown in FIG. 2, the exhaust port 95 lies somewhat to the side of engine 21 and extends upwardly and over a portion of engine 21. Exhaust port 95 joins into an exhaust manifold 97 and continues to extend over the top side of engine 21.

The exhaust manifold 97, which forms the first length of the horizontal portion of the exhaust system, joins an exhaust bellows 99. Exhaust bellows 99 has a series of corrugations along its main body portion, and is typically made of a flexible material. The material of exhaust bellows 99 must have the ability to flexibly cycle a large number of times because each time the driveshaft housing 29 and lower unit 31 is steered, the exhaust bellows 99 will be flexed. Exhaust bellows 99 positioned at the lateral center of outboard motor 11, along its center line, and along the steering axis indicated by marker 69 in FIG. 1. In this manner, the exhaust bellows 99 will flex evenly for steering movement of the driveshaft housing 29, rather than stretch and compress, as the case would be if it were mounted off center. This is important to extend the life exhaust bellows 99, because a flexing motion about its center line produces less deformation than would stretching compression.

The other end of exhaust bellows 99 is connected to an exhaust muffler 101. Exhaust muffler 101 forms the last part of the horizontal portion of the exhaust system, makes a right angle in the downward direction and then forms the first part of the vertical portion of the exhaust system. Exhaust muffler 101 then opens into an exhaust chamber 103 within its boundary. Exhaust chamber 103 forms an expanding cone section 105 and a shrinking cone section 107 along its length from the first part of the vertical portion nearest its entrance, to a point near an exit pipe 109. These expanding and shrinking cone sections 105 and 107 are sections of increasing and decreasing cross sectional area along the length of exhaust muffler 101 from a point nearer its entrance to a point nearer its exit. Exit pipe 109 terminates at an end 109, within an exhaust chamber 111 which is in communication, through a path not shown, with the center portion of propeller 93. In this manner the exhaust gases are expelled through propeller 93, typically beneath the water line in order to improve silencing. The extended distance between exhaust port 95 and the point where the exhaust gases are expelled through propeller 93 is made possible in part locating the engine 21 forward of the transom 13 while extending the driveshaft housing 29 and lower unit 31 farther aft of the transom 13.

To provide insulatory cooling water for the engine 21 and exhaust system of the outboard motor of the present invention, a water jacketing system is provided. In FIG. 1, a water pump 113 is connected to a water inlet 115. The outlet of water pump 113 is in communication with a cooling water passage 117 which extends into a cooling water hose 119. Cooling water hose is in communication with a water jacket 121, which extends from points over the engine 21 surrounding exhaust ports 95 and exhaust manifold 97 to form an annular passage 123. Annular passage 123 is formed between the interior of water jacket 121 and the exterior of the exhaust ports 95 and exhaust manifold Annular passage 123 extends rearwardly where it is defined by the exterior of the exhaust bellows 99 and the interior of a water bellows 125.

Water bellows 125 is similar in general geometry to exhaust bellows 99 in that they have sealing ends and a corrugated center section. Water bellows 125 lies concentrically about exhaust bellows 99 and provides a continuation of the annular flow of annular passage 123 path about the exhaust bellows 99. addition, water bellows 125 is also typically made of a flexible material. The material of water bellows 125 must also have the ability to flexibly cycle a large number of times because each time the driveshaft housing 29 and lower unit 31 is steered, the exhaust bellows 125 will be flexed.

Water bellows 125 is also positioned at the lateral center of outboard motor 11, along its center line, and along the steering axis indicated by marker 69 in FIG. 1. In this manner, the water bellows 125 will also flex evenly for steering movement of the driveshaft housing 29, rather than stretch and compress, as the case would be if it were mounted off center. Even more importantly, water bellows 125 must bend and flex evenly to keep an even annular separation from exhaust bellows 99. An even annular space insures that adequate cooling water will surround exhaust bellows 99, and keep its temperature uniformly relatively low. If this were not so, and one portion of the radial extension of exhaust bellows 99 was starved cooling water, a localized hot spot would occur which could unduly thermally cycle or damage the exhaust bellows 99 at the hot spot, as well as the concentrically adjacent spot on the water bellows 125.

The space between water bellows 125 and exhaust bellows is in open communication with a water passage 127 in the upper portion of the driveshaft housing 19. Water passage 127 extends downwardly and is defined in the upper portion of the drive shaft housing 29 by the external surface of muffler 101 and the internal surface of the upper portion of the drive shaft housing 29. At the lower end of the driveshaft housing 29, water passage 127 is defined by the external surface of the muffler 101 and the internal surface of an annular cone section 129.

Water passage 127 then is coextensive with the length of muffler 101 to a point where the exit pipe 109 begins. The point at which annular cone section 129 ends is the point at which water passage 127 opens into a water chamber 131. Water chamber 131 extends around the exterior of annular cone section 129. Water chamber 131 is defined forward of annular cone section 129 by the forward section of driveshaft housing 29, and forms a substantial volume therewith. Water chamber 131 is defined aftwardly of annular cone section 129, for a very short distance, and is bound by a retaining wall 133. The separation between retaining wall 133 and the exterior of the annular cone section 129 is about the same as the separation between muffler 101 and annular cone section 129.

As is illustrated in FIG. 1, there is a water level present in water chamber 131, as indicated by the numeral 135. Water level 135 coincides with the uppermost edge of retaining wall 133, the uppermost edge of retaining wall 133 forming a spillway over which cooling water runs. The cooling water runs into a rear chamber 137 where it exits through a number of horizontal slots 139.

The volume of water held within water chamber 131 adds additional weight to the driveshaft housing 29, and thus contributes additional weight to the rear of the outboard motor 11. As discussed in the co-pending applications referred to above, additional rearward weight adds to the efficiency of the outboard motor 11 by lessening the degree of trim necessary for proper operation of the boat to which outboard motor 11 attached, for a given set of boat weight distribution characteristics.

Figure 3:
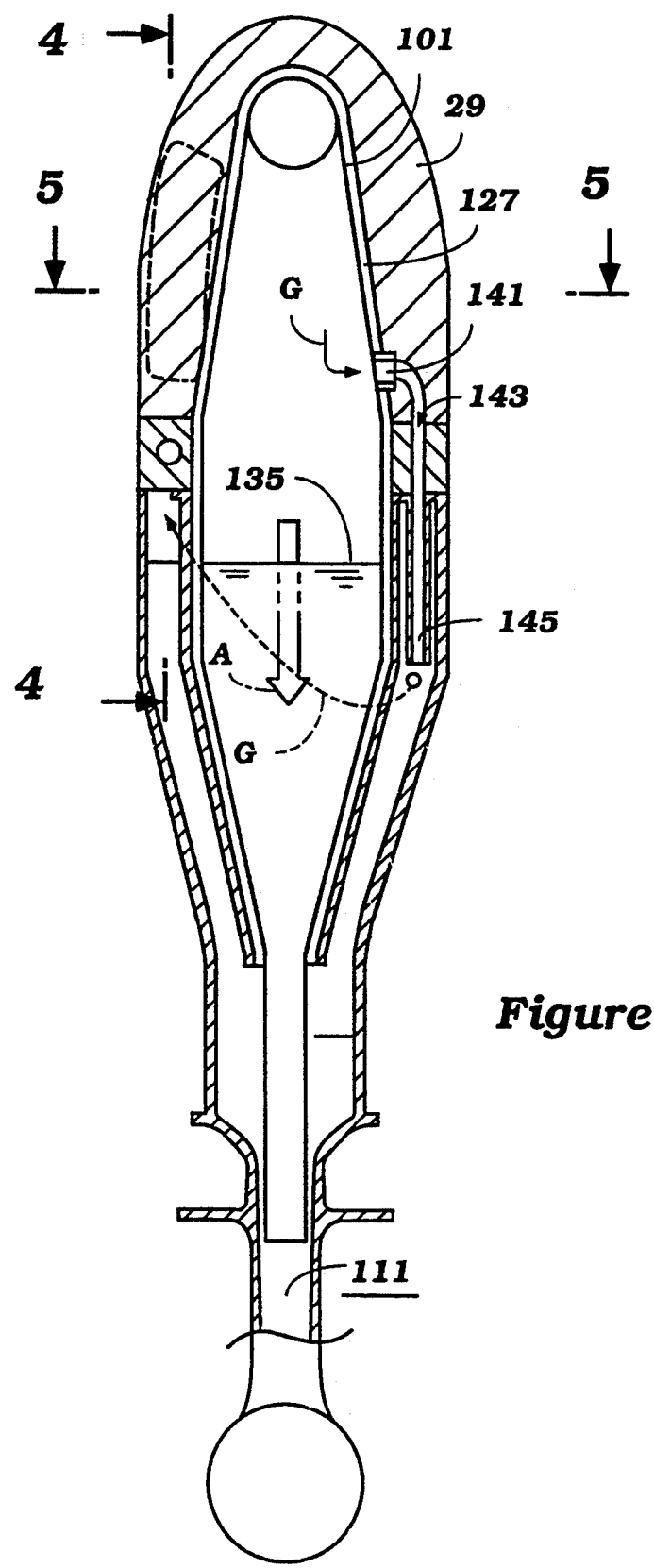
FIG. 3 is a view taken along line 3—3 of FIG. 2.

The explanation of the low speed exhaust system begins with reference to muffler 101. In FIG. 1, muffler 101 is shown as having an aperture 141 in its starboard side. Referring to FIGS. 2 and 3, aperture 141 opens into a low speed exhaust conduit 143 which extends downwardly along the side of muffler 101. The exhaust gas path through the low speed exhaust system will be represented as a flow path arrow having an identifier "G" to stand for the gas flow path. Low speed exhaust conduit 143 extends into and is formed by a portion of the driveshaft housing 29. Low speed exhaust conduit 143 continues downwardly through driveshaft housing 29 extending into a tubular portion 145 within water chamber 131. Tubular portion 145 continues downwardly beneath the water level 135. Note that the end of tubular portion 145 extends for only a finite distance beneath the water level 135. In this manner, the amount of back pressure or head experienced by gases entering the tubular portion 145 should remain relatively constant.

Exhaust gases leaving or bubbling from the end of tubular portion 145 rise to water level 135 and collect above water level 135. This bubbling action cools the exhaust gases utilizing the same water which surrounds muffler 101. In addition, the bubbling action causes turbulence in the water surrounding muffler 101 to increase the heat transfer from muffler 101 to the cooling water. The exhaust gases, after having bubbled through the water in water chamber 131 migrate generally upwardly and around the aft portion of muffler 101. This action is represented in dashed line format, and is again illustrated in FIG. 3 with a "G" designation.

Figure 4:
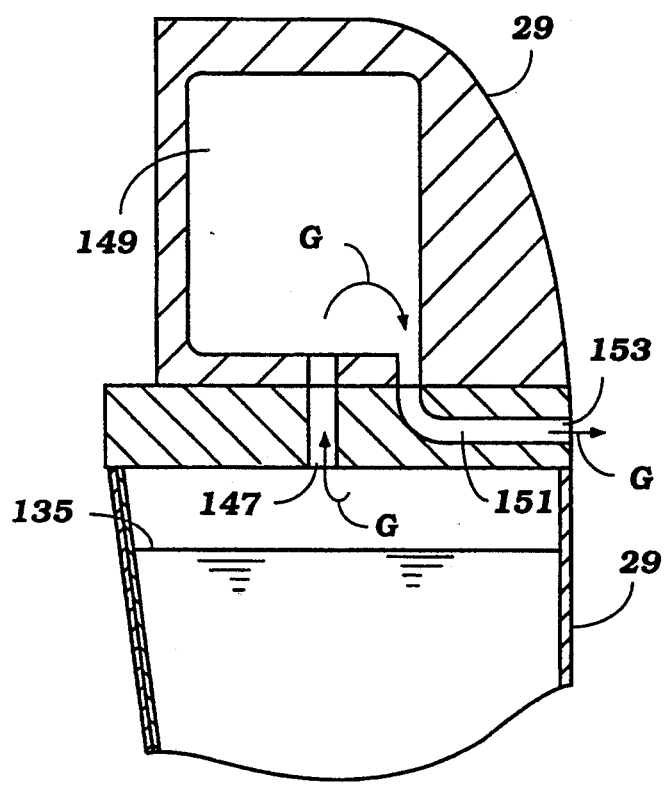
FIG. 4 is a view taken along line 4—4 of FIG. 3.
Figure 5:
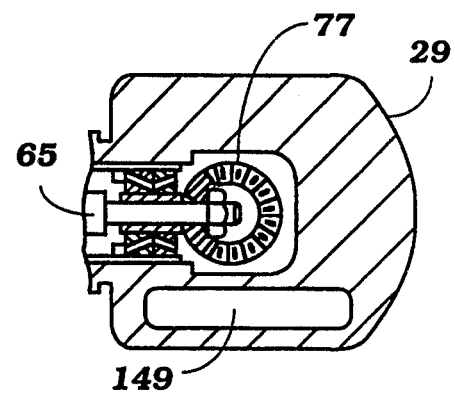
FIG. 5 is a view taken along line 5—5 of FIG. 3.

Referring to FIG. 4, the section taken along line 4—4 of FIG. 3 illustrates water level 145 at the port side of the water chamber 131. As the exhaust gases collect above water level 145, and their pressure increases, and the cooled exhaust gases flow into a low speed exhaust chamber entry port 147 disposed within the driveshaft housing 29 above the water level 135. Entry port 147 expands into the low speed exhaust expansion chamber 149. As can be seen from FIGS. 3-5, the low speed exhaust expansion chamber 149 is a somewhat rectangularly shaped void despite the rounded corners and edges. After circulating within chamber 149, the exhaust gases exit through an exhaust port 151. At the end of exhaust port 151 is an aperture 153 through which the low speed exhaust gases are expelled to the atmosphere, the gas flow path again designated in arrow format with a "G" identifier.

The tilt system for the outboard motor 11 is adjacent transom 13. A power tilt device is generally designated as 155. Power tilt device 155 has an oil pump (not shown) adjacent an electric motor 157 situated atop power tilt device 155. Adjacent electric motor 157 and connected to clamp bracket 17 at a point near the housing of power tilt device 155, is a tilt cylinder 159 having a tilt cylinder rod 161 attached to the upper inside portion of the driveshaft housing 29. Laterally adjacent the lower portion of tilt cylinder 159 is a trim cylinder 163 attached to power tilt device 155. Trim cylinder 163 has a trim cylinder rod 165 which makes contact with an arm 167. Arm 167 is attached to driveshaft housing 29.

Note that tilt cylinder 159 is angled differently than trim cylinder 163. Tilt cylinder 159 is positioned to swing driveshaft housing 29, and therefore the lower 31, to a wide angle. Wide angle tilt, or tilting adjustment, usually involves a gross adjustment where the lower unit 31 is tilted to an extreme angle, usually for shallow water trolling, and to avoid perpendicular contact of the lower unit 31 with debris, etc. Trim cylinder 163 provides narrow angled trimming adjustment. Trimming adjustment is a fine adjustment made usually during cruise to achieve optimal fine angle adjustment of the lower unit 31 to adjust the quality of ride or select the optimum angle of thrust of lower unit 31 for most efficient operation. The most efficient operation will dictate a fine, or trimming adjustment based upon the loading and distribution of the loading within a boat.

Adjacent transom 13 near the base of power tilt device 129 is provided a structural member 171 of clamp bracket 17 having a stopping pin 173. An arm 175 attached to driveshaft housing 29 rests against stopping pin 173 and provides a limit from which trim cylinder 163 and tilt cylinder 159 may begin to provide a range of movement of the drive shaft housing 29 with respect to engine 21 and clamp bracket 17.

The pivoting system provides a means to steer the boat to which outboard motor 10 is attached. Near the center of driveshaft housing 29, an upper steering bracket 177 and a lower steering bracket 179 are fixedly attached to driveshaft housing 29. Upper and lower steering brackets, 177 and 179, pivotally engage a steering shaft 181. Steering shaft 181 is journaled by a swivel bracket 183. Swivel bracket 183 is supported by clamp bracket 17.

The systems of the outboard motor 11 are enclosed as a single unit. The marine propulsion of the present invention is fitted with an engine cowling 185, an engine hood 187 and a moveable hood section 189. Moveable hood section 189 is situated to partially cover the top of the driveshaft housing 29. A generally frusto-conical shaped sleeve 191 is surroundingly connected at its smaller end to a portion of the exterior of water jacket 121. At its larger end it is connected at its upper surface to moveable hood section 189, and at its lower surface to a point over the drive shaft 63. In this manner, the area around the engine 21 is isolated, but the moveable hood section 189 is still allowed to freely tilt upwardly.

FIG. 2 also illustrates, in dashed line format, the position of the lower unit 29 as it would appear during starboard swivel. This indicates the relative range of movement in one direction necessary to enable the proper degree of steering of the boat onto which the outboard motor of the present invention would be affixed. FIG. 2 also illustrates the relative position of the exhaust system with regard to engine 21. The foregoing disclosure and description of the invention are illustrative and explanatory thereof and various changes in the configuration of the disclosed outboard motor, relative amounts of space saved, relative degree to which an extended center of gravity is maintained, the relative portions of the outboard motor which are allowed to pivot, the extent to which the systems of an outboard motor are trimmingly tilted to achieve desired trim, the materials of construction, and location of the apex of the angle of pivot or tilt, along with any changes of the illustrated construction, may be made without departing from the spirit or scope of the invention.

What is claimed:

1. An outboard motor for attachment as a unit to the transom of a watercraft comprising: means for affixing said outboard motor unit to said transom; an engine having a horizontally disposed engine output shaft and at least one exhaust port disposed forwardly of said transom; a driveshaft housing disposed rearwardly of said transom and journaling a driveshaft for rotation about a generally vertically extending axis and driven by said output shaft; propulsion means at the lower end of said driveshaft housing and driven by said driveshaft for propelling the watercraft; a generally vertically extending expansion chamber formed in said driveshaft housing and having a horizontally extending med at the upper end of said expansion chamber and said driveshaft housing; and, exhaust means extending from said engine exhaust to said horizontally extending inlet for delivering exhaust gasses thereto, for expanding said exhaust gasses, and restricted exhaust gas discharge in the lower portion of said driveshaft housing for subsequently contracting exhaust gases before discharging to the atmosphere, through an underwater high speed exhaust discharge and low speed exhaust means, extending from said expansion chamber to the atmosphere above the water for cooling and expanding exhaust gases before discharging to the atmosphere.

2. The outboard motor as recited in claim 1, wherein said high speed exhaust means further comprises a water jacket surrounding at least in part said expansion chamber.

3. The outboard motor as recited in claim 1 wherein said low speed exhaust means further comprises an exhaust gas conduit having a first end in communication with said expansion chamber and a second end opening beneath said water level within said water jacket; and, a low speed expansion chamber having an entry port disposed over said water level in said water jacket and having an exit port in communication with the atmosphere.

4. The exhaust system as set forth in claim 3, wherein said entry port and said exit port are disposed beneath said low speed expansion chamber.

5. The outboard motor as recited in claim 1 wherein said expansion chamber has first an increasing cross sectional area and then a decreasing cross sectional area along its length.

6. The outboard motor as recited in claim 5, wherein said increasing cross sectional area and said decreasing cross sectional area have a conical shape.

7. An outboard motor as set forth in claim 1 further including an input shaft driven by the engine output shaft at one end thereof and driving the upper end of the driveshaft at the upper end thereof said horizontally extending inlet being disposed at least in part above said input shaft.

8. An outboard motor as set forth in claim 7 further including bevel gear means for driving the upper end of said drive shaft from said input shaft, said bevel gear means being juxtaposed to the intersection of said horizontally extending inlet and said expansion chamber.

* * * * *